(12) United States Patent
Walker (10) Patent No.: US 10,716,257 B2
(45) Date of Patent: Jul. 21, 2020

(54) CONVEYOR CHAIN WITH MULTI-SEGMENT CONVEYING FLOOR

(71) Applicant: CNH Industrial America LLC, New Holland, PA (US)

(72) Inventor: Eric L. Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/049,873

(22) Filed: Jul. 31, 2018

(65) Prior Publication Data
US 2020/0037505 A1    Feb. 6, 2020

(51) Int. Cl.
A01D 45/02    (2006.01)

(52) U.S. Cl.
CPC .................................. A01D 45/023 (2013.01)

(58) Field of Classification Search
CPC .. A01D 43/082; A01D 43/088; A01D 45/021; A01D 45/023; A01D 57/22
USPC .......... 56/62, 103, 60, 143, 145, 93, 98, 119
See application file for complete search history.

(56) References Cited

U.S. PATENT DOCUMENTS

| | | | |
|---|---|---|---|
| 3,260,041 A * | 7/1966 | McRoberts | A01D 45/22 56/119 |
| 3,894,382 A | 7/1975 | Jauss | |
| 4,143,504 A | 3/1979 | Noack et al. | |
| 4,464,888 A * | 8/1984 | Burton | A01D 46/28 56/330 |
| 4,607,703 A * | 8/1986 | Wang | A01D 29/00 171/1 |
| 4,845,930 A | 7/1989 | Dow | |
| 5,341,630 A * | 8/1994 | Littau | A01D 46/28 56/330 |
| 5,668,532 A | 9/1997 | Beer et al. | |
| 6,925,790 B1 * | 8/2005 | Krone | A01B 73/044 56/51 |
| 7,484,348 B2 * | 2/2009 | Bich | A01D 45/023 56/93 |

FOREIGN PATENT DOCUMENTS

| | | |
|---|---|---|
| DE | 103 27 176 A1 | 1/2005 |
| FR | 2119742 A5 | 8/1972 |
| WO | 2017027486 A1 | 2/2017 |
| WO | 2017200872 A1 | 11/2017 |

OTHER PUBLICATIONS

Extended European Search Report for EP Application No. 19188201.8 dated Dec. 17, 2019 (five pages).

* cited by examiner

Primary Examiner — Robert E Pezzuto
(74) Attorney, Agent, or Firm — Pater K. Zacharias; Patrick M. Sheldrake (57) ABSTRACT

A header for an agricultural vehicle including a header frame, and at least one row unit supported by the header frame. The at least one row unit including a pair of gatherers configured for conveying a crop material. Each gatherer including a chain and a plurality of plates connected to the chain. The plurality of plates at least partially overlap to define a conveying floor that has a continuous upper portion for receiving and transporting a dislodged crop material and an outer periphery for gathering the crop material.

20 Claims, 6 Drawing Sheets

(Prior Art)

CONVEYOR CHAIN WITH MULTI-SEGMENT CONVEYING FLOOR

FIELD OF THE INVENTION

The present invention pertains to agricultural vehicles and, more specifically, to agricultural vehicles with corn headers.

BACKGROUND OF THE INVENTION

An agricultural harvester known as a "combine" is historically termed such because it combines multiple harvesting functions with a single harvesting unit, such as picking, threshing, separating, and cleaning. A combine includes a header, which removes the crop from a field, and a feeder housing which transports the crop matter to a threshing and cleaning system. The threshing and cleaning system may include a threshing rotor that rotates within a housing and performs a threshing operation on the crop material to remove the grain. The housing may include adjustable concaves with perforations for the grain to pass therethrough. Once the grain is threshed, it falls through the perforations in the concaves onto a grain pan. From the grain pan, the grain is cleaned using the cleaning system, which generally includes one or more sieve(s) and a cleaning fan. The cleaning fan blows air through the sieves to discharge chaff and other debris toward the rear of the combine. The clean grain is then transported to a grain tank onboard the combine via a clean grain auger. Material other than grain (MOG), such as straw, debris, dust, etc., from the threshing section proceeds through a residue system, which may utilize a straw chopper to process the MOG and direct it out through the rear of the combine. Typically, a combine is equipped with side doors that allow an operator to easily access the threshing and cleaning system.

A corn header generally includes a conveyor, row units, and accompanying drive architecture to power the header. The conveyor is disposed aft of the row units and it may be in the form of a conveyor belt, an auger with a tubular shaft having left and right fighting, or a combination of both. The row units generally include snouts, gathering chains, and stalk rolls. The snouts are conically shaped to pass in between the rows of corn, defining a designated passageway in between the snouts for the rows of corn to travel therein. Hence, a respective row unit may have a slot to receive a respective row of corn. This slot may be between 19-38 mm wide and approximately 152 mm long. Each row unit also includes respective gear boxes to drive the gathering chains and stalk rolls. A gathering chain generally includes chain links that form an endless chain and protuberances, such as paddles, affixed thereto for contacting the corn stalks. Typically, a gathering chain has 48 chain links and 6-8 paddles spaced about the endless chain. As the agricultural vehicle traverses the field, the corn stalks are pulled inwardly by the gathering chains and downwardly by the stalk rolls. This motion causes the ears of corn to contact the base of the header, e.g. deck plate, and thereby the ears snap off their respective stalks. The gathering chains additionally help to move crop material inwardly towards the conveyor, which transports the ears of corn to the center of the header for entry into the feeder house. The stripped corn stalks are further pinched and crushed by the stalk rolls, in order to accelerate the decomposition process of the stalks. The header may also include chopping units that have reciprocating blades located beneath the stalk rolls to chop the stalks, leaves, and MOG in order to more easily incorporate the remaining residue in subsequent tillage practices.

Conventional row units may lead to a loss of yield due to losing grain in between the paddles of the gathering chains and/or at the space between juxtaposed gathering chains. Since gathering chains may have a substantial amount of space in between respective paddles there is a high probability that dislodged, i.e. free, kernels and/or ears of corn may pass through these spaces and thereby may never be conveyed into the header. Likewise, crop material may undesirably fall through the slot in between juxtaposed gathering chains. In more detail, when the ears of corn are separated from the stalks, via forcibly contacting the deck plate, a portion of the grain on an ear of corn may become dislodged on impact. For instance, up to 6% of the weight of an ear of corn can become dislodged upon impact, which could then fall through the spaces in the gathering chain and/or the slot in between juxtaposed gathering chains instead of being conveyed into the header. Also, grain may be lost as a result of plugging of the crop material at the front of the row units. As the gathering chains rotate, the paddles may undesirably break or bend the stalks which then causes a buildup of fallen crop material at the front of the row unit. This plugging at the front of the row unit can effectively decrease the efficiency of the row unit and/or lead to a loss of yield as some crop material may fall out of the row unit or may not even enter the row unit since the passageway within the row unit has become at least partially plugged.

What is needed in the art is an improved gathering chain that can more efficiently gather and convey the crop material.

SUMMARY OF THE INVENTION

In one exemplary embodiment formed in accordance with the present invention, there is provided a header with row units that have crop gatherers which each include a chain and floor plates that fit together to create a multi-segment conveying floor that does not have any gaps or holes. The multi-segment conveying floor of the gatherer performs the functions of gathering the standing crop material and receiving and conveying dislodged crop material, such as individual pieces of grain, into the header.

In another exemplary embodiment formed in accordance with the present invention, there is provided a header for an agricultural vehicle including a header frame, and at least one row unit supported by the header frame. The at least one row unit including a pair of gatherers configured for conveying a crop material. Each gatherer including a chain and a plurality of plates connected to the chain. The plurality of plates at least partially overlap to define a conveying floor that has a continuous upper portion for receiving and transporting a dislodged crop material and an outer periphery for gathering the crop material.

In yet another exemplary embodiment formed in accordance with the present invention, there is provided a row unit for a header of an agricultural vehicle. The row unit includes a pair of gatherers configured for conveying a crop material. Each gatherer includes a chain and a plurality of plates connected to the chain. The plurality of plates at least partially overlap to define a conveying floor that has a continuous upper portion for receiving and transporting a dislodged crop material and an outer periphery for gathering the crop material.

In yet another exemplary embodiment formed in accordance with the present invention, there is provided a method for conveying a crop material. The method includes the steps of providing a header for an agricultural vehicle. The header includes a header frame and at least one row unit supported by the header frame. The at least one row unit includes a pair of gatherers configured for conveying a crop material. Each gatherer includes a chain and a plurality of plates connected to the chain. The plurality of plates at least partially overlap to define a conveying floor that has a continuous upper portion and an outer periphery. The method also includes the steps of gathering the crop material by the outer periphery of the conveying floor, receiving a dislodged crop material by the continuous upper portion of the conveying floor, and transporting the dislodged crop material by the continuous upper portion of the conveying floor.

One possible advantage of the exemplary embodiment of the agricultural vehicle is that the floor plates of the gatherers gently convey the stalks of corn and save dislodged corn kernels, thereby leading to a higher yield.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
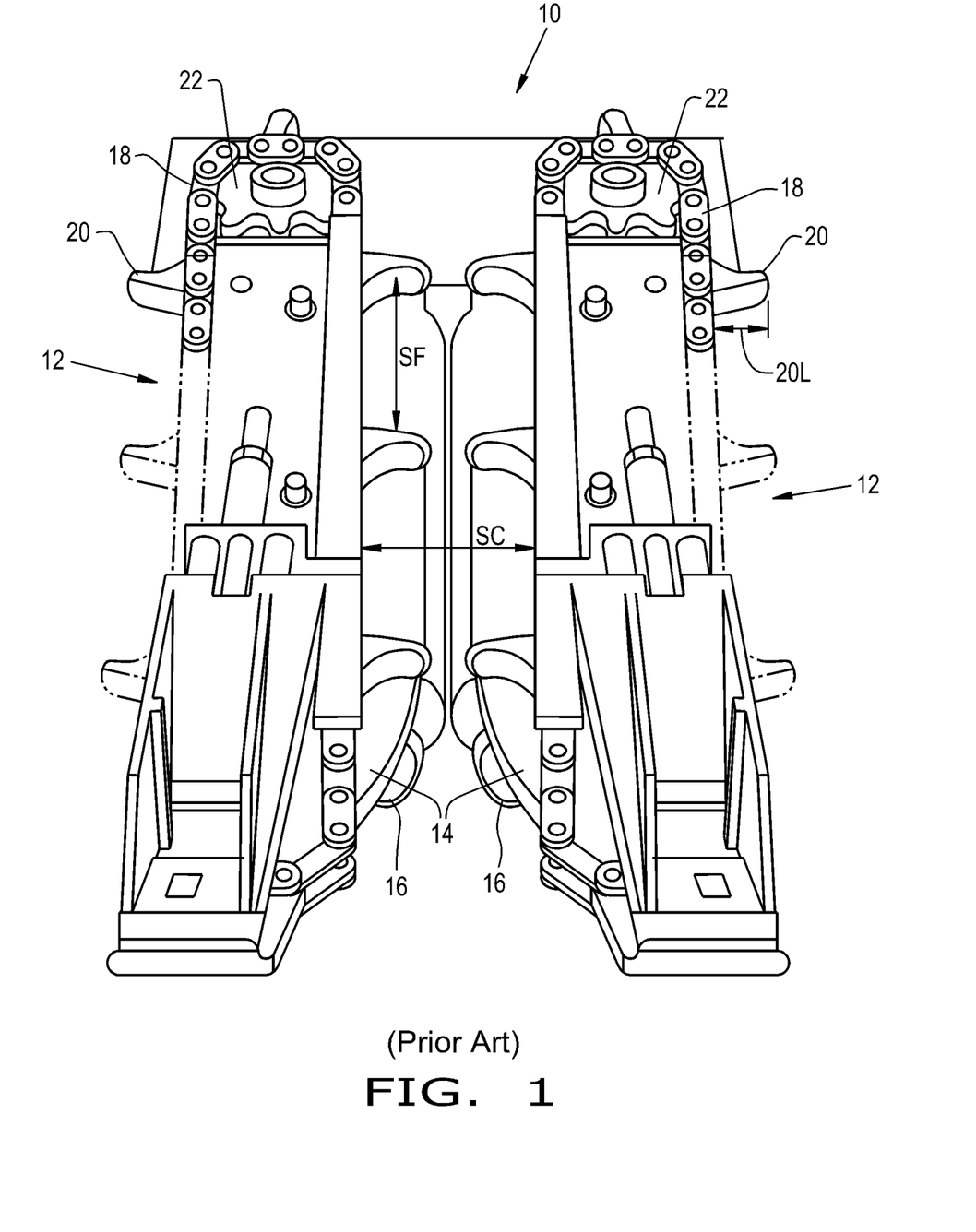
FIG. 1 illustrates a front perspective view of a conventional row unit.
Figure 2:
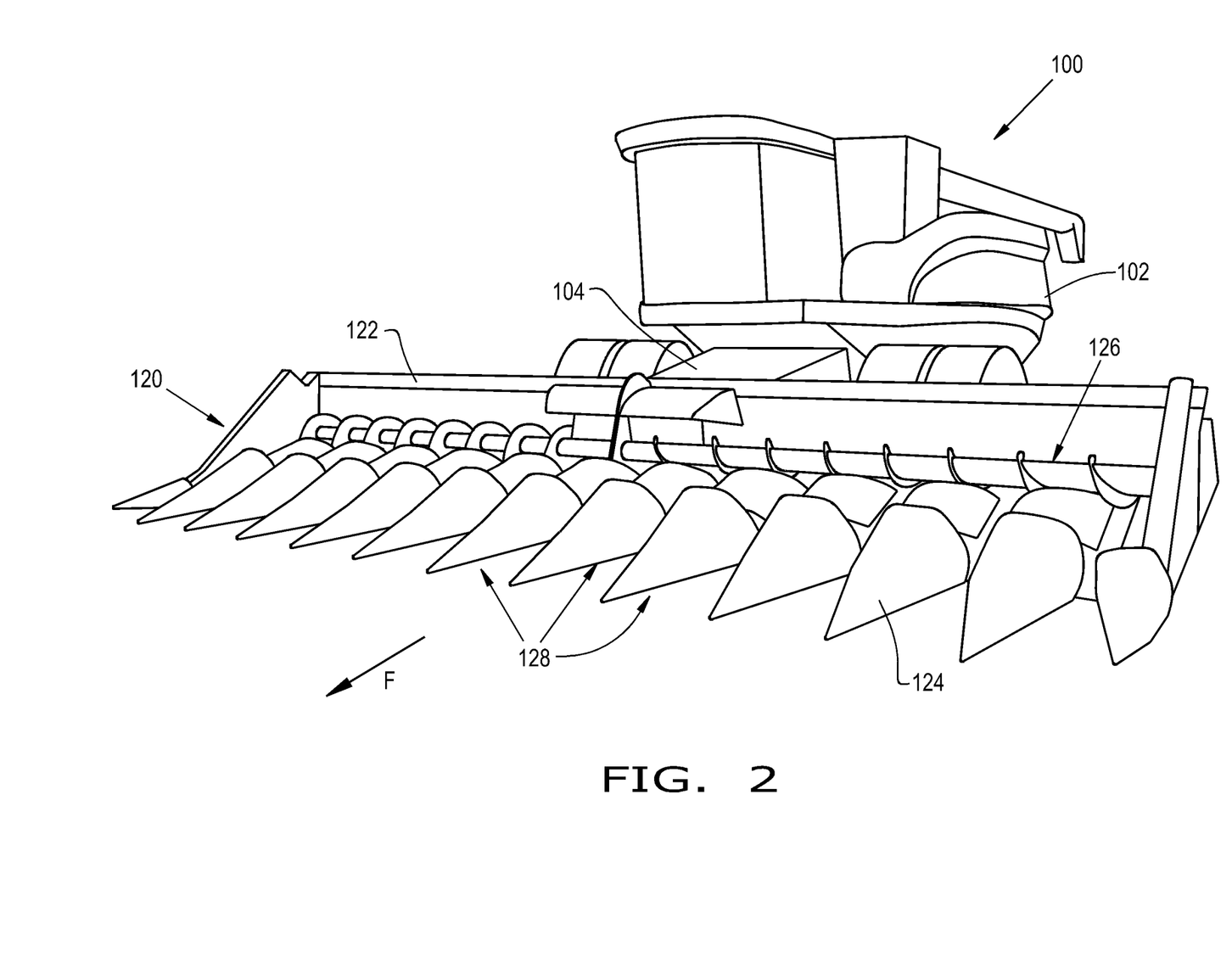
FIG. 2 illustrates an exemplary embodiment of an agricultural vehicle with a corn header, in accordance with an exemplary embodiment of the present invention.

Referring now to the drawings, and more particularly to FIG. 1, there is shown a conventional row unit 10 for a corn header of an agricultural vehicle. Generally, a corn header includes multiple row units 10 which define spaces in between snouts for receiving the rows of corn. Each row unit 10 generally includes a pair of gathers 12, stripper, e.g. deck, plates 14, and a pair of crop rollers 16. Each row unit 10 may also include crop choppers, located underneath the crop rollers 16, which can be in the form of blades that cut the corn stalks into smaller pieces (not shown). Each gatherer 12 typically includes a chain 18 and a plurality of protuberances 20 connected to the chain 18. The chains 18 may be operably coupled to and driven by sprockets 22. The protuberances 20 may be in the form of fingers 20 which contact and convey the crop material rearwardly toward the inside of the header. The protuberances 20 may extend outwardly from the chain 18 and may have a length 20L. Conventional row units such as the row unit 10, as shown in FIG. 1, may undesirably allow crop material, such as free grain, to fall through the spaces SF in between respective fingers 20 and/or through the space SC in between respective chains 18.

Referring now to FIGS. 2-5, there is shown an agricultural vehicle 100 according to the present invention which generally includes a chassis 102, a feeder housing 104 supported by the chassis 102, and a header 120 connected to the feeder housing 104 and supported by the chassis 102. The agricultural vehicle 100 may be in the form of an axial flow combine.

Figure 3:
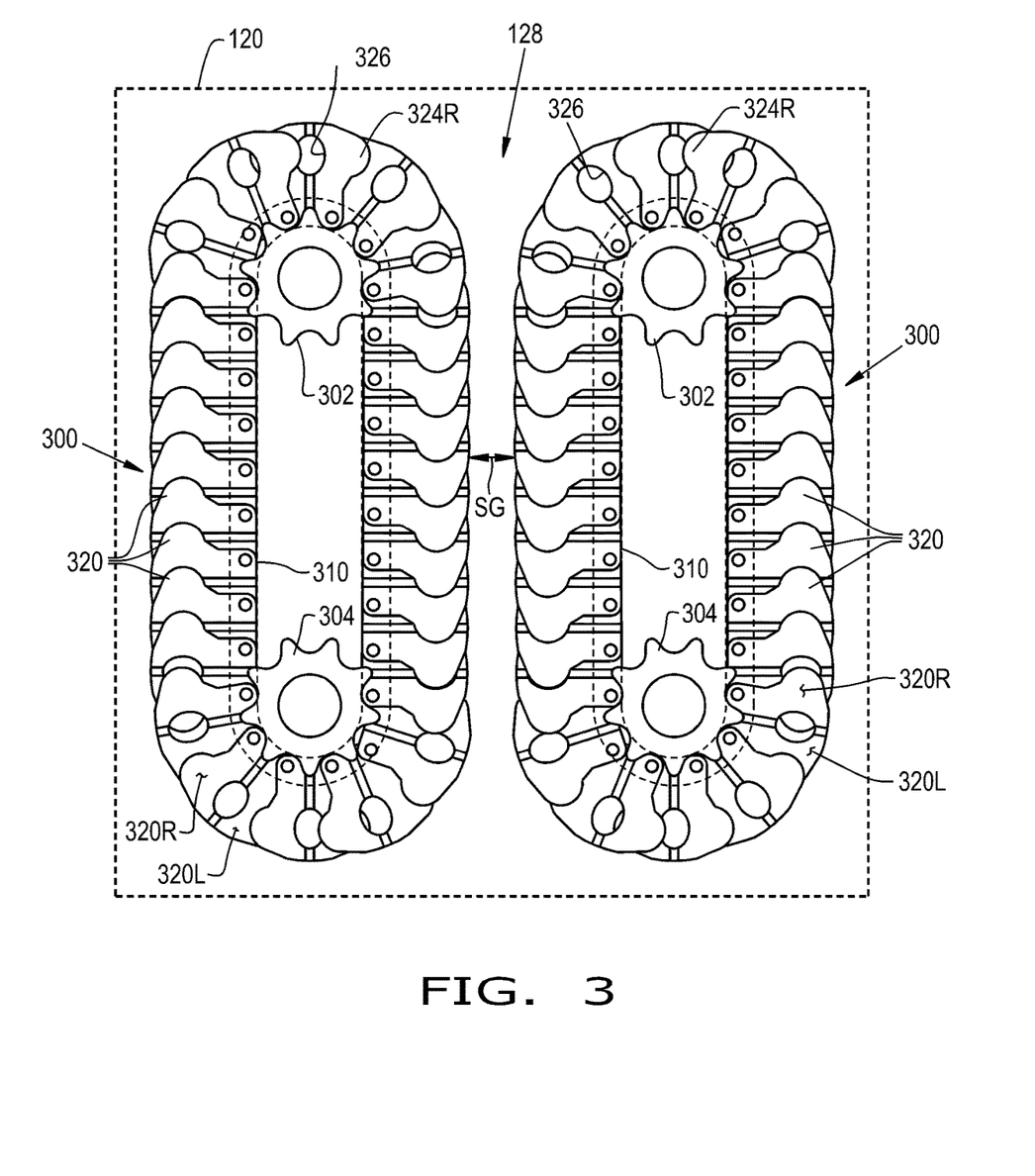
FIG. 3 illustrates a top view of the row unit of the corn header as shown in FIG. 2, in accordance with an exemplary embodiment of the present invention.

The header 120 may include a header frame 122, multiple snouts 124 defining crop receiving spaces between each snout 124, a crop conveyor 126 such as an auger 126 to convey the crop material inwardly toward the feeder housing 104, and row units 128. Each row unit 128 may include a pair of gatherers 300, a pair of snap rollers, and/or a pair of choppers (FIG. 3). The gatherers 300, snap rollers, and/or the choppers may be driven by gearboxes coupled to one or more cross shaft(s) operably coupled to the PTO of the agricultural vehicle 100. Each row unit 128 may or may not include a pair of deck plates which snap off the ears of corn when the ears of corn forcibly contact the deck plates. As the agricultural vehicle 100 traverses a field in a forward direction, denoted by arrow "F", the standing corn stalks are cut from the field and the ears of corn are stripped from the stalks by the motion of the gatherers 300 and stalk rolls. The ears of corn are then gathered by the conveyor 126 and are transported to the center of the header 120 for entry into the feeder housing 104 and subsequent downstream processing through the agricultural vehicle 100. The stalks and the remaining MOG are pulled down by the stalk rolls and may be chopped into smaller pieces by the chopper.

Figure 4:
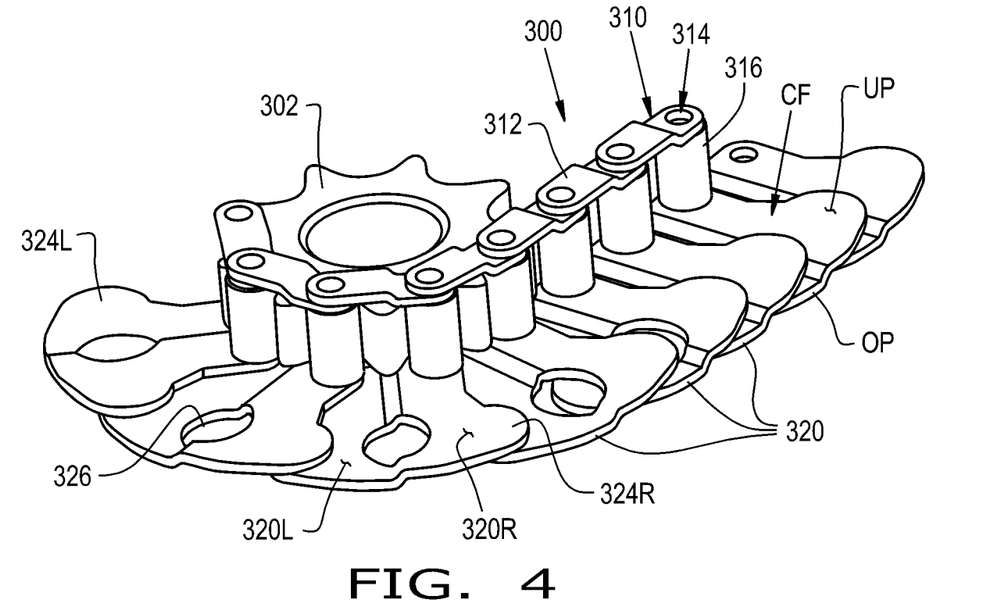
FIG. 4 illustrates the crop gatherer of the row unit, in accordance with an exemplary embodiment of the present invention.
Figure 5:
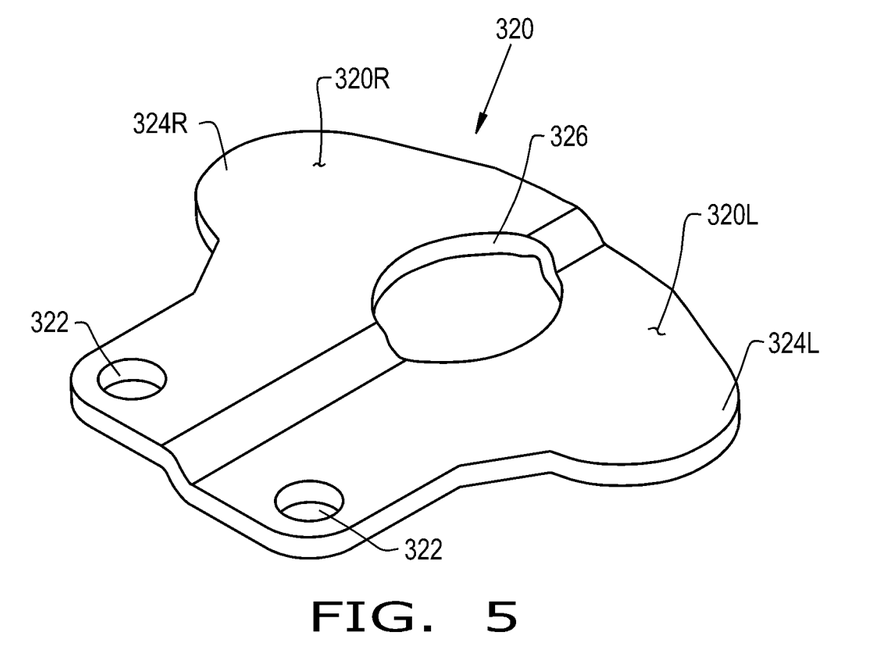
FIG. 5 illustrates a perspective view of a plate of the crop gatherer of FIGS. 3-4, in accordance with an exemplary embodiment of the present invention.

Referring now more specifically to FIGS. 3-5, the gatherers 300 are configured for contacting and inwardly directing the crop material. The gatherers 300 may be juxtaposed to one another such that they are separated by a space SG extending longitudinally along the length of the gatherers 300. Hence, as the header 120 is moved in the forward direction F, the rows of corn enter through the space SG in between the gatherers 300. Each gatherer 300 may include an endless chain 310 and plates 320 attached to the chain 310. The chain 310 may be composed of links 312, pins 314 connecting the links 312, and rollers 316 that surround the pins 314 and engage with sprockets 302, 304 (FIG. 4). The gatherers 300 may or may not include protuberances, such as fingers, that are connected to the chain 310 and contact the crop material. The protuberances may have the same length of the plates 320, or alternatively the protuberances may be shorter or longer than the plates 320.

The plates 320 contact and convey the crop material inwardly into the header 120. The plates 320 can be in the form of floor plates 320 which together form the complete multi-segment floor that contacts the corn stalks such that as the corn stalks enter the space SG, the plates 320 contact and move the corn stalks rearwardly, and further the plates 320 capture and convey dislodged, e.g. free grain. Each gatherer 300 has a rotational path that includes a transition section in which the plates 320 at least partially separate when traveling around the front and rear sprockets 302, 304, e.g. at the top and bottom of the rotational path, and a conveying section, along each side of the rotational path, in which the plates 320 at least partially overlap with one another such that the plates 320 define a conveying floor CF with a continuous upper portion UP and an outer periphery OP (FIG. 4). It should be appreciated that the plates 320 may always at least partially overlap, whereby the plates 320 only partially overlap in the transition section and the plates 320 substantially overlap in the conveying section of the rotational path. The continuous upper portion UP as used herein refers to the top sections of the overlapping plates 320 which are presently located at the sides of the rotational path in the conveying section, and the word "continuous" as used herein signifies that the plates 320 overlap to uniformly create a complete conveying surface that does not have any holes or gaps through which crop material may be lost. In this regard, the plates 320 will substantially overlap to create multi-segment conveying floor for transporting crop material, such as ears of corn, dislodged kernels, etc., rearwardly toward the conveyor 126 of the header 120. The plates 320 may include a plurality of mounting holes 322 through which the pins 314 of the chain 310 extend in order to couple the plates 320 to the chain 310. The plates 320 may fit in between the rollers 316 and the lower set of links 312 (FIG. 4). Alternatively, the plates 320 may be welded to the lower set of the links 312 of the chain 310. The plates 320 may be composed of any desired material(s), for example the plates 320 may be made of metal, e.g. stainless steel, plastic, and/or rubber.

In operation, the outer periphery OP of the conveying floor CF, i.e., the edges of the plates 320, may gently contact and squeeze the corn stalks to thereby provide positive engagement and acquisition of the corn stalks for directing the corn stalks inwardly toward the conveyor 126. Hence, the plates 320 can aggressively acquire the corn stalks while maintaining a gentle grip on the corn stalks. Thereby, the plates 320 may pick up down crop material, fragile crop material, and/or prevent plugging at the front of the row unit 128. Also, since the conveying floor CF does not have any holes or gaps, the plates 320 receive dislodged crop material, such as individual corn kernels, and then the plates 320 convey the crop material rearwardly toward the conveyor 126. At the bottom of the rotational path, for example adjacent to the sprockets 304 at the rear of the row unit 128, the plates 320 may at least partially separate from one another in order to help facilitate the conveyance of the dislodged crop material into the conveyor 126. It should be appreciated that the plates 320, due to their proximity to the crop rollers, may operate in tandem with the deck plates, or the plates 320 may replace the deck plates such that the plates 320 additionally function to contact and remove the ears of corn from the corn stalks as the ears of corn forcibly hit the plates 320.

The plates 320 may not be substantially flat; for example, the plates 320 may be offset and may include a raised portion 320R and a lowered portion 320L. As the plates 320 at least partially overlap, a respective raised portion 320R fits on top of a respective lowered portion 320L of a pair of adjacent plates 320. Each plate 320 may be offset following a middle line of the plate 320 so that a first half of each plate 320 is the raised portion 320R and a second half of each plate 320 is the lowered portion 320L. The plates 320 may additionally include one or more tab(s), such as a raised tab 324R and a lowered tab 324L, and one or more receiving hole(s) 326 which receive(s) the tab(s) 324R, 324L as the plates 320 at least partially overlap during the conveying section of the rotational path of the gatherers 300 (FIG. 5). In more detail, during the conveying section of the rotational path, a respective receiving hole 326 of a respective plate 320 will be substantially covered by a tab 324R of a neighboring plate 320 on one side of the respective plate 320 and by a tab 324L of another neighboring plate 320 on an opposite side of the respective plate 320. Hence, the receiving holes 326 of the plates 320 will be open during the transition section and will be substantially covered, for example the receiving hole 326 will be sufficiently blocked so that an individual kernel cannot pass therethrough, during the conveying section of the rotational path of the gatherers 300. Thereby, dislodged crop material will be successfully transported by the gatherers 300 in the conveying section and will be deposited, via passing through the receiving holes 326 and/or over the edges of the plates 320, into the header 120.

Figure 6:
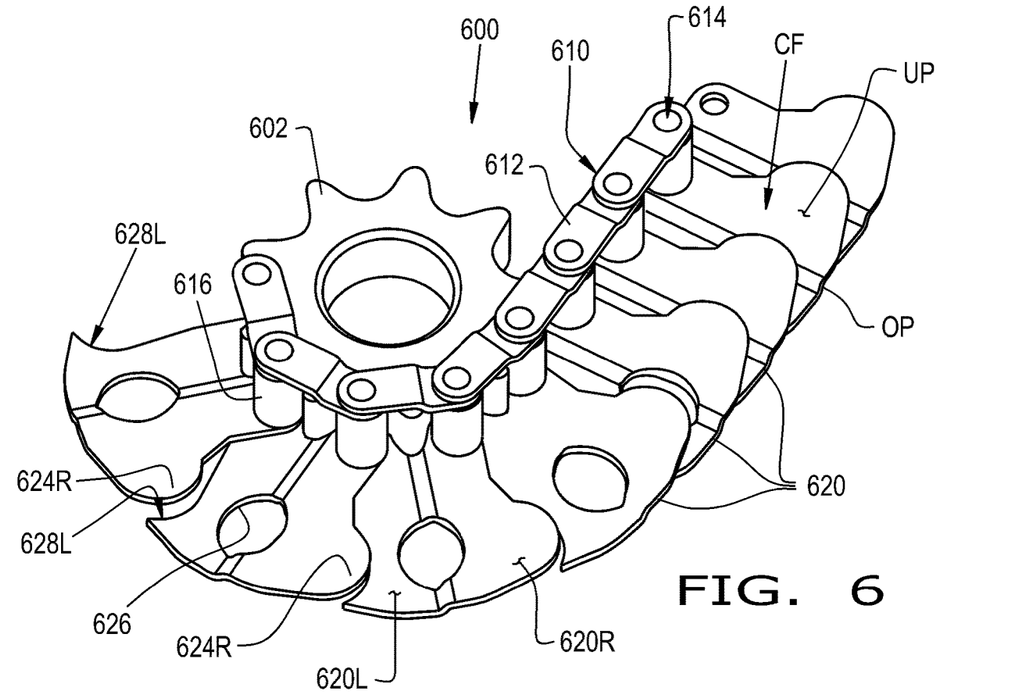
FIG. 6 illustrates another embodiment of a crop gatherer, in accordance with an exemplary embodiment of the present invention.
Figure 7:
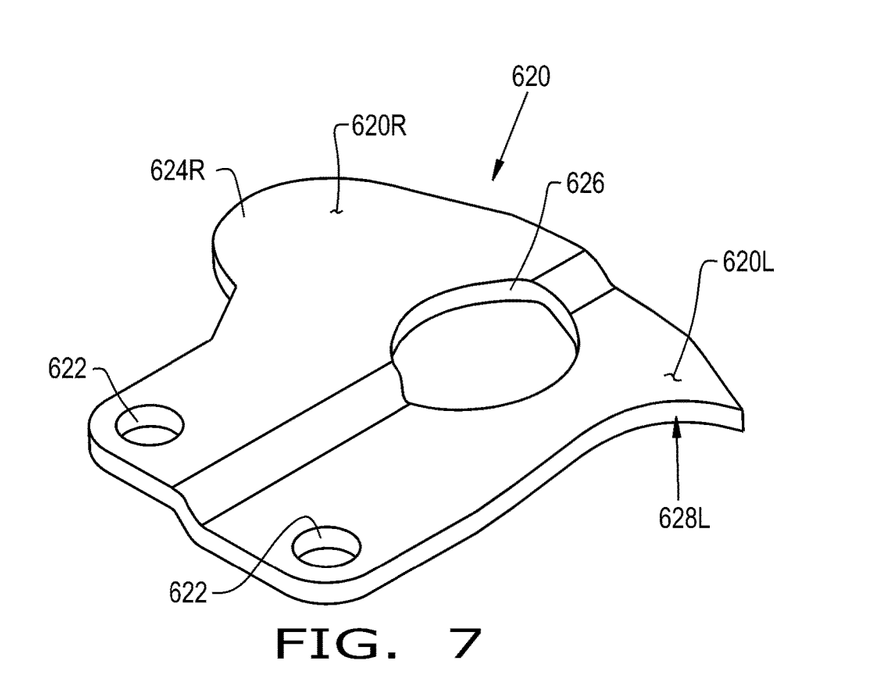
FIG. 7 illustrates a perspective view of a plate of the crop gatherer of FIG. 6, in accordance with an exemplary embodiment of the present invention.

Referring now to FIGS. 6-7, there is shown another exemplary embodiment of a gatherer 600 for a row unit 128. The gatherers 600 may be designed similarly to and function as the gatherers 300 as described above except that the gatherers 600 include plates 620 that have one tab 624R associated with the raised portion 620R and a respective recess 628L associated with the lowered portion 620L. Thus, like components have been identified with like reference characters except with the 600 series designation. The configuration of the plates 620 allows the receiving holes 626 to be at least partially covered by only the raised tabs 624R of neighboring plates 620 during the conveying section of the rotational path of the chains 610 of the gatherers 600 (FIG. 6). It should be appreciated that in an alternative exemplary embodiment of the present invention, the plates 620 may have a single tab and corresponding recess that are respectively associated with the lowered portion 620L and the raised portion 620R.

Figure 8:
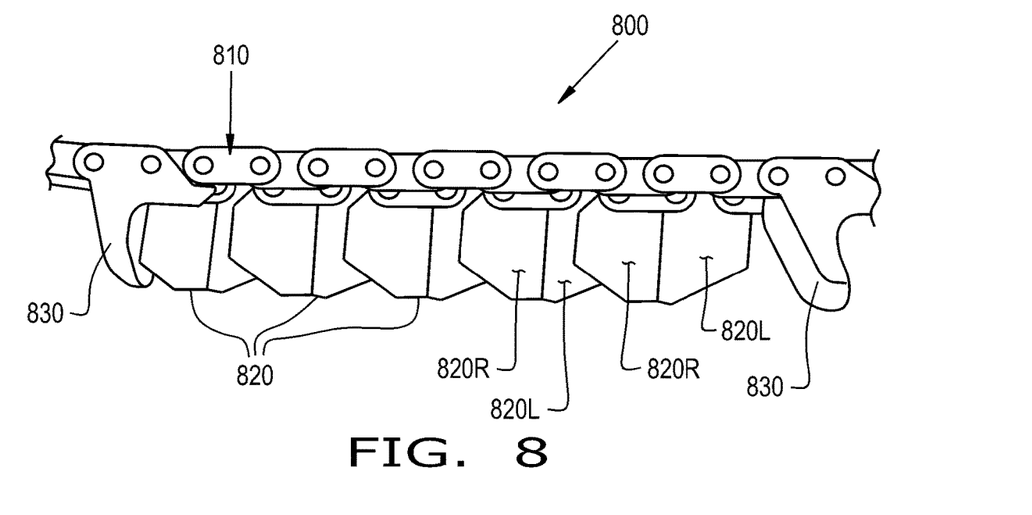
FIG. 8 illustrates another embodiment of a crop gatherer, in accordance with an exemplary embodiment of the present invention.

Referring now to FIG. 8, there is shown another exemplary embodiment of a gatherer 800 for a row unit 128. The gatherer 800 may be substantially similar to the gatherer 300 as discussed above and thereby like components have been identified with like reference characters except for the 800 series designation. The plates 820 of the gatherer 800 are similar to the plates 320 except that the plates 820 do not include tabs and receiving holes and the plates have an elongated cross-section, e.g. a substantially rectangular cross-section. Thereby, the raised portion 820R slides at least partially on top of the lowered portion 820L as the gatherer 800 enters the conveying section of its rotational path. As shown in the present exemplary embodiment, the gatherer 800 may also include protuberances 830, such as fingers 830, that are connected to the chain 810 and are configured for contacting and conveying the crop material rearwardly. The plates 820 are shown to be welded onto the bottom edge of the chain 810; however, the plates 820 may include mounting holes which mount the plates 820 onto the chain 810 as discussed above. It is conceivable for the plates 820 to include tabs and/or receiving holes (not shown).

Figure 9:
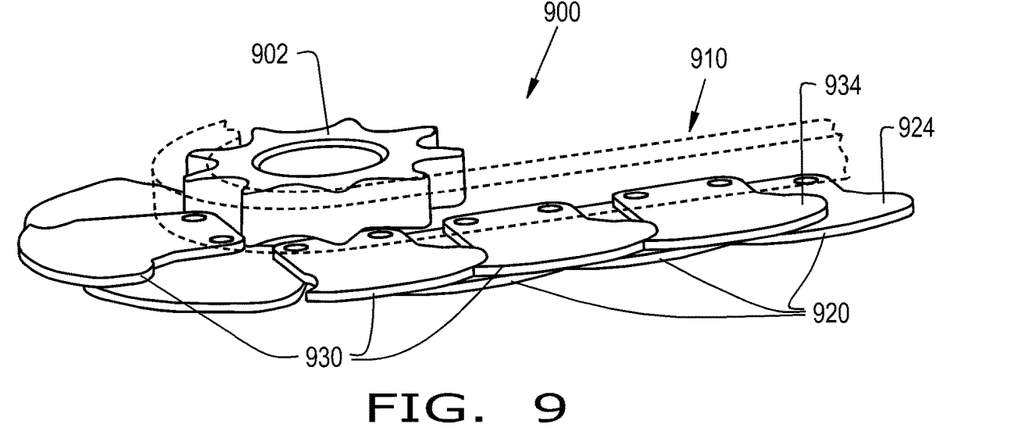
FIG. 9 illustrates another embodiment of a crop gatherer, in accordance with an exemplary embodiment of the present invention.

Referring now to FIG. 9, there is shown another exemplary embodiment of a gatherer 900 for a row unit 128 which generally includes overlapping plates in the form of lower flat plates 920 and upper flat plates 930 which are respectively connected to the chain 910 at respective locations such that the upper flat plates 930 at least partially overlap on top of the lower flat plates 920 during the conveying section of the rotational path of the gatherer 900. The lower and upper flat plates 920, 930 may each include one or more tab(s) 924, 934. The lower and upper flat plates 920, 930 may also include recesses (unnumbered) in order to accommodate the tab(s) 924, 934 of adjacent lower and upper flat plates 920, 930, respectively. As shown, the lower and upper flat plates 920, 930 do not include a receiving hole, for grain to pass therethrough, as discussed above. However, in an alternative exemplary embodiment the lower and upper flat plates 920, 930 may include a receiving hole (not shown). It should be appreciated that the gatherer 900 may be designed and function similarly to the gatherer 300 as described above; thereby, like components have been identified with like reference character except for the 900 series designation.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A header for an agricultural vehicle, comprising:
a header frame; and
at least one row unit supported by the header frame, the at least one row unit including a pair of gatherers configured for conveying a crop material, the pair of gatherers being juxtaposed to one another and spaced apart from one another such that a space is formed in between the pair of gatherers for receiving the crop material therethrough, and each gatherer of the pair of gatherers including a chain and a plurality of plates connected to the chain, and the plurality of plates at least partially overlap to define a conveying floor that has a continuous upper portion for receiving and transporting a dislodged crop material and an outer periphery for gathering the crop material.

2. The header of claim 1, wherein each plate of the plurality of plates has a raised portion and a lowered portion such that as the plurality of plates at least partially overlap a respective raised portion fits on top of a respective lowered portion of a pair of adjacent plates.

3. The header of claim 2, wherein each plate of the plurality of plates includes at least one tab and at least one receiving hole.

4. The header of claim 3, wherein the raised portion includes a first tab and the lowered portion includes a second tab such that as the plurality of plates at least partially overlap to define the conveying floor a respective receiving hole of a respective plate of the plurality of plates is substantially covered by a respective first tab of a neighboring plate of the plurality of plates on one side of said respective plate and by a respective second tab of another neighboring plate of the plurality of plates on an opposite side of said respective plate.

5. The header of claim 1, wherein the chain includes a plurality of links, a plurality of pins connecting the plurality links, and a plurality of rollers surrounding the plurality of pins, and the plurality of plates includes a plurality of mounting holes which receive the plurality of pins and couple the plurality of plates to the chain.

6. The header of claim 1, wherein each plate of the plurality of plates is welded to the chain.

7. The header of claim 1, wherein the plurality of plates includes lower flat plates connected to the chain and upper flat plates connected to the chain which at least partially overlap on top of the lower flat plates.

8. The header of claim 1, wherein the at least one row unit does not include a pair of deck plates, and the gatherers are configured for contacting and removing a plurality of ears of corn from a plurality of corn stalks.

9. A row unit for a header of an agricultural vehicle, comprising:
a pair of gatherers configured for conveying a crop material, the pair of gatherers being juxtaposed to one another and spaced apart from one another such that a space is formed in between the pair of gatherers for receiving the crop material therethrough, and each gatherer of the pair of gatherers including a chain and a plurality of plates connected to the chain, and the plurality of plates at least partially overlap to define a conveying floor that has a continuous upper portion for receiving and transporting a dislodged crop material and an outer periphery for gathering the crop material.

10. The row unit of claim 9, wherein each plate of the plurality of plates has a raised portion and a lowered portion such that as the plurality of plates at least partially overlap a respective raised portion fits on top of a respective lowered portion of a pair of adjacent plates.

11. The row unit of claim 10, wherein each plate of the plurality of plates includes at least one tab and at least one receiving hole.

12. The row unit of claim 11, wherein the raised portion includes a first tab and the lowered portion includes a second tab such that as the plurality of plates at least partially overlap to define the conveying floor a respective receiving hole of a respective plate of the plurality of plates is substantially covered by a respective first tab of a neighboring plate of the plurality of plates on one side of said respective plate and by a respective second tab of another neighboring plate of the plurality of plates on an opposite side of said respective plate.

13. The row unit of claim 9, wherein the chain includes a plurality of links, a plurality of pins connecting the plurality of links, and a plurality of rollers surrounding the plurality of pins, and the plurality of plates includes a plurality of mounting holes which receive the plurality of pins and couple the plurality of plates to the chain.

14. The row unit of claim 9, wherein each plate of the plurality of plates is welded to the chain.

15. The row unit of claim 9, wherein the plurality of plates includes lower flat plates connected to the chain and upper flat plates connected to the chain which at least partially overlap on top of the lower flat plates.

16. The row unit of claim 9, wherein the row unit does not include a pair of deck plates, and the gatherers are configured for contacting and removing a plurality of ears of corn from a plurality of corn stalks.

17. A method for conveying a crop material, comprising the steps of:
  providing a header for an agricultural vehicle, the header including a header frame and at least one row unit supported by the header frame, the at least one row unit including a pair of gatherers configured for conveying the crop material, the pair of gatherers being juxtaposed to one another and spaced apart from one another such that a space is formed in between the pair of gatherers for receiving the crop material therethrough, and each gatherer of the pair of gatherers including a chain and a plurality of plates connected to the chain, and the plurality of plates at least partially overlap to define a conveying floor that has a continuous upper portion and an outer periphery;
  gathering the crop material by the outer periphery of the conveying floor;
  receiving a dislodged crop material by the continuous upper portion of the conveying floor; and
  transporting the dislodged crop material by the continuous upper portion of the conveying floor.

18. The method of claim 17, wherein each plate of the plurality of plates has a raised portion and a lowered portion such that as the plurality of plates at least partially overlap a respective raised portion fits on top of a respective lowered portion of a pair of adjacent plates.

19. The method of claim 18, wherein each plate of the plurality of plates includes at least one tab and at least one receiving hole.

20. The method of claim 17, wherein the at least one row unit does not include a pair of deck plates, and the method includes an additional step of contacting and removing, by the gatherers, a plurality of ears of corn from a plurality of corn stalks.

* * * * *